July 9, 1940.                A. P. DE SEVERSKY                2,207,242
                              AIRCRAFT STRUCTURE
                             Filed June 15, 1937            2 Sheets-Sheet 1

INVENTOR:
Alexander P. de Seversky;
BY:
HIS ATTORNEY.

July 9, 1940.   A. P. DE SEVERSKY   2,207,242
AIRCRAFT STRUCTURE
Filed June 15, 1937   2 Sheets-Sheet 2
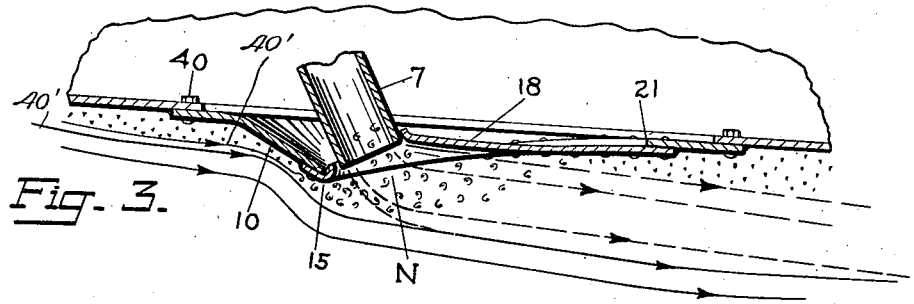
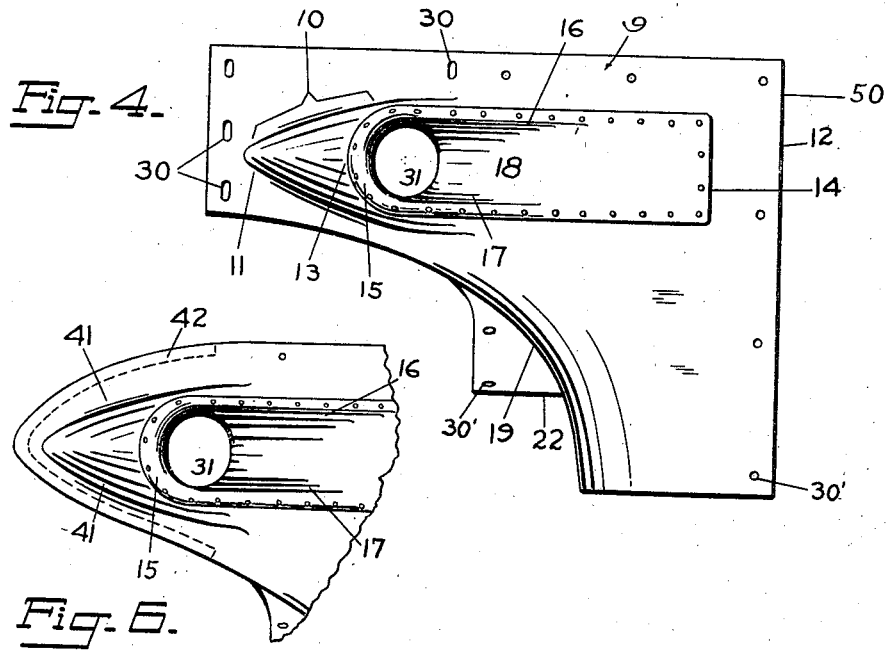
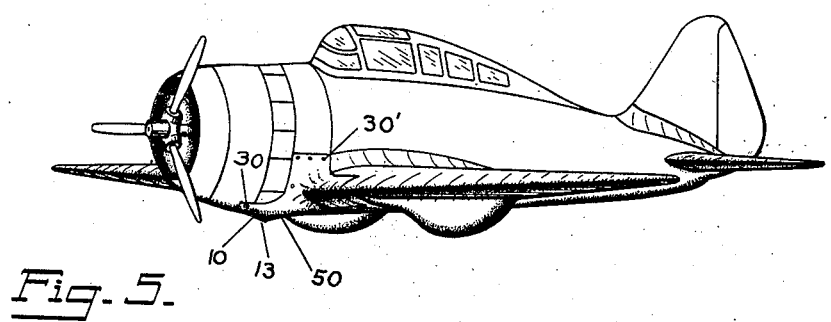
INVENTOR:
Alexander P. de Seversky;
BY:
HIS ATTORNEY.

Patented July 9, 1940

2,207,242

UNITED STATES PATENT OFFICE

2,207,242

AIRCRAFT STRUCTURE

Alexander P. de Seversky, Locust Valley, N. Y., assignor to Seversky Aircraft Corporation, Farmingdale, N. Y.

Application June 15, 1937, Serial No. 148,286

1 Claim. (Cl. 244—53)

The concepts of this invention involve aircraft structure, and especially have to do with the structure of aircraft in connection with the various materials discharged or emitted from the aircraft consequent upon the operation thereof. More particularly is the invention concerned with the structure of aircraft in the region of the engine or engines.

One of the disadvantages of subsistent aircraft emitting materials, and especially from aeronautical engines, is the usually quite small difference obtaining between the high pressure existing in the material emitter, such as an engine, and the high positive aerodynamic pressure obtaining on that portion of the aircraft into which the material, such as products of combustion, are emitted, and which portion is usually at, or near, the nose of the craft. This small pressure-difference, coupled with the usually tortuous, angled, etc., construction of the outlet pipes, such as collectors, exhaust stacks, etc., produces a quite appreciable and undesirable back-pressure on the emitter, such as an engine, whenever the emitter is operating. Moreover, the aerodynamic characteristics of the structure of the ordinary aircraft-fuselage and wings in this region, especially between the outlet means, such as exhaust stacks, etc., and the wings, are such as to tend to disturb the airflow, form "pockets," "back-up the air" and otherwise increase the drag, parasitic resistance and skin friction, rather than to have the opposite effect.

It is, therefore, one of the principal objects of the invention to improve the construction of aircraft at, and in the vicinity of, the nose cowling, and in the region between the cowling and the adjacent portions of the wing and the fuselage, in such manner as to not only thereby reduce head-resistance, drag, parasitic resistance, and skin-friction:—but whereby to directly, positively and substantially augment the emission of materials from the craft, such as the exhausting of gases from the engine. The invention aims to produce this improved result regardless of whether the aircraft is in the air, flying at any given speed and in any given attitude; or whether it is on the ground, taxying; or whether it is stationary, the prime requisite being merely that the engine and propeller be operating.

It is also one of the principal objects of the invention to improve the functioning and the efficiency of aeronautical prime-movers, and particularly of internal combustion engines; and to provide an improved method of exhausting same and of disposing of the exhaust therefrom.

A further object of the invention is to completely eliminate that back-pressure on aircraft power plants which is due mainly to the gases themselves, and to eliminate that back-pressure on the engine which is due to the necessarily complex formation of the structure of the exhaust system itself.

A particular object of the invention is to provide a novel sheet metal article of manufacture for use in aircraft to carry out these improved aerodynamic functions, yet which will be, nonetheless, quickly and easily manufacturable, on the quantity-scale of production, by a few, simple stamping operations, from, if desired, a single sheet of material.

The concept also includes providing an article of manufacture of this novel nature which can, notwithstanding these improvements incorporated in it, be quickly but securely attachable in place, and easily detached.

These and other inventive concepts, together with other objects and advantages of the invention, will be made more manifest as this disclosure progresses; and with these and other objects and aims in view, the invention includes the concepts, structures, combinations, sub-combinations, and elements set forth hereinafter, covered by the sub-joined claim, and shown in the accompanying drawings by way of example.

In these drawings,

Fig. 3 is a longitudinal, detailed section on line 3—3 of Fig. 4, with the article of Fig. 4 inverted;

Fig. 4 is a bottom plan view of one of the present improved articles-of-manufacture for application to the right-hand side of the airplane, around the primary and secondary cowlings, around the exhaust stack and around the adjacent entering edge of the wing;

Fig. 5 is a perspective view of a typical high-speed airplane with which the invention is particularly adapted for use, and Fig. 6 is a fragmentary, top plan showing the presently-preferred embodiment of the invention.

Figure 1:
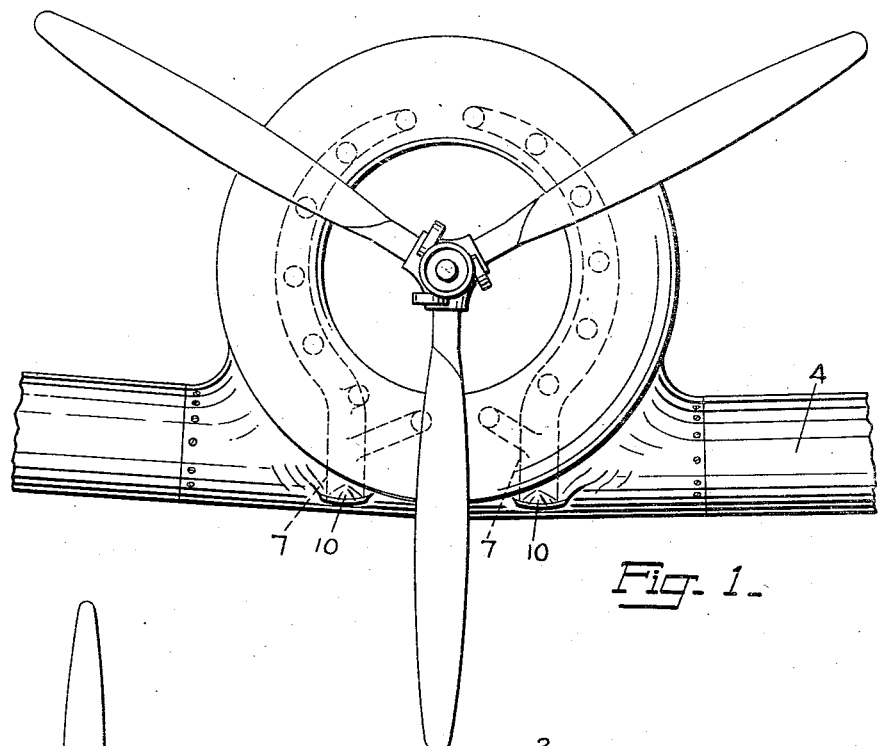
Fig. 1 is a fragmentary, diagrammatic front elevation of an aircraft which embodies the invention, the craft being in a substantially horiontal position and certain unessential details not being shown

As shown in the accompanying drawings, the invention contemplates, generally, constructing that portion of the nose cowling that lies in the region of the exhaust stacks, and between the stacks and the entering edge of the wing, in an improved manner, to obtain novel effects, by aerodynamic phenomena. For purposes of exemplification, the invention is shown incorporated in a military type airplane having the highest speed and highest performance characteristics, with safety and stamina, that is at present to be found on the market, and which craft includes a primary nose cowling 1, a secondary nose cowling 2, and a wing 3, having a leading edge 4.

The primary nose cowling, in the conventional manner and for well-know purposes, shields or encases, in the present embodiment, a radial, air-cooled engine shown diagrammatically at 20, and which may be either of the double row type illustrated, or the well-known single row type, without altering the spirit and effect of the present invention. In either case, the engine includes outlets 5, and collectors 6, terminating in exhaust stacks 7. If desired, the collectors may be of the type that are united at the bottom to form a circle, in which case a single exhaust stack is employed at the bottom periphery thereof, in a well-known manner. The exhaust stack, in such instance, will be located centrally, on the plane of symmetry o fthe craft. The engine is shown as connected to drive a propeller 8, here shown as of the tri-blade type employed in the highest speed aircraft, having safety and stamina, now on the market.

Figure 2:
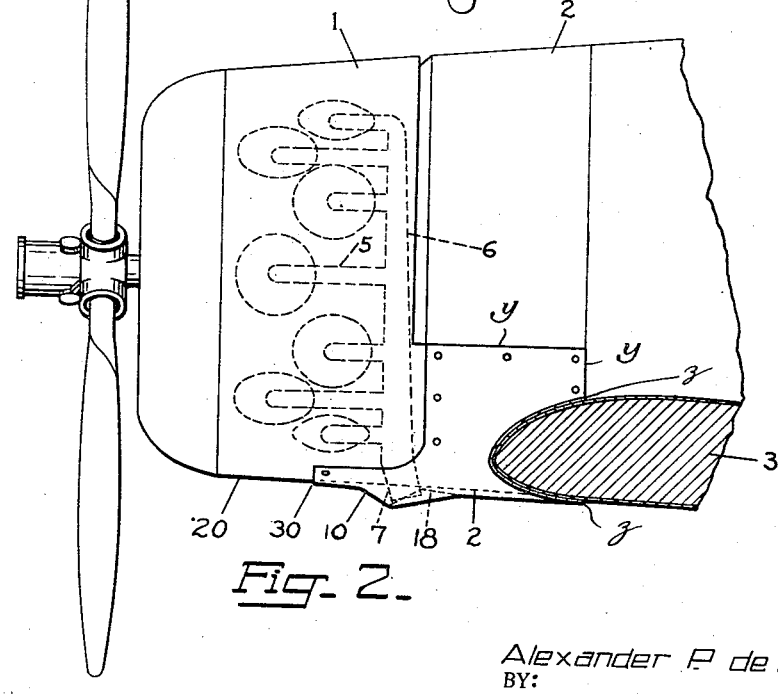
Fig. 2 is a fragmentary, diagrammatic side elevation of the nose portion thereof.

The new article of manufacture of the present invention, is shown in plan in Figures 4 and 6, and consists essentially of a unitary member, made preferably by one stamping operation of sheet metals such as duralumin or other aluminum alloy, and stainless steel. The article is shown applied over the exhaust stacks and the cowlings of the nose portion of the craft in Figures 1, 2, and 5. The article is applied as a unit around each exhaust stack and is, in the form shown in Figures 2, 3 and 4, secured by its forward edges over the primary cowling portion, being fastened through it to a ring in the framing of the primary cowling at the points 30, in this modification, through the medium of slotted bolt-holes and bolts, as shown, and for a purpose to be hereinafter made manifest. It is secured by suitable easily disengageable fastening devices on its longitudinal interior edge to members near the center line of the cowling. It is fastened to the entering edge of the wing by its edges, z, and to the anti-buffetting fillets by its edges, y. In order to permit ready attachment and detachment, such improved fastening means as the cooperating curved spring and rotatable button units, known as Dzus fasteners are preferably employed at all fastening points, except the points 30

More particularly, the article includes primarily a structural portion generally designated by the numeral 9, which has longitudinally, laterally and vertically thereof, ordinates and abscissae giving it an airfoil section, to be later particularized, such as to cause it to give a decided aerodynamic reaction with both the relative wind and the propeller blast. The portion 9 is shaped, in its forward region in the form of a more or less pointed, streamlined entering-edge 10, having an airfoil cross-section and outer surface. In fact, the entire lower surface of the portion 9, from a point 11 to a point 12, is shaped and cambered with abscissae and ordinates calculated to produce this decided downwardly-directed reaction with aerodynamic air. The vertical thickness of this formation is made sufficiently great to obtain an effective aerodynamic reaction merely from the propeller blast, when the craft is taxying or on the chocks, and its camber etc., is therefore sufficient when the craft is gliding, or moving at speeds usually insufficient to produce an effective reaction on a lift surface by the relative wind.

The specific airfoil-form shown comprises, in the lower portion of the article, between its outermost surface and the engine cowling, that portion of an airfoil section the ordinates and abscissae of which are those determined, by appropriate wind-tunnel tests, as those best for the purposes contemplated, that lies above the mean chord thereof. It is inverted and applied to the under side of the engine cowling in the manner shown best in Figures 1, 2, 3, and 5.

The lift-section, portion 11—12, is lined, from a point 13 to a point 14, with a non-corrodible material preferably stainless steel and here shown as in the form of a plate or inset-member. The inset-portion includes a yoke-formation 15, for partially encircling an aperture 31, for receiving the exhaust stack. The upper edge of the yoke 15 is continued rearwardly on each side of the orifice in the form of ridges,—a longer ridge 16 and a shorter ridge 17,—both having their upper surfaces curved from front to rear to: proper airfoil camber, as shown in Fig. 3. Viewing Figures 3 and 4, a depression 18 is established in the lining of the airfoil starting just aft of the edge of the exhaust stack orifice being formed therein by suitable bending or stamping operations sufficient to constitute the front face of the depression a deflector plate 19, a further description of the structure and function of which will be given hereinafter. The lining member is preferably attached to the rest of the article over asbestos gaskets 21 by means of rivets or the like rigid-fastening means. The major portion of the formation is thus heat-insulated from the rest of the article and thereby is removed any danger of heat deformation from its proper shape.

As shown in Fig. 4, the article also includes an aerodynamic anti-pocketing formation 19. This formation is located between the rearward end of the stacks and the wing, and prevents the relative wind, the propeller slip-stream, and the exhaust gases, from compressing, or backing-up, in front of the wing between the exhaust and the entering edge of the wing, and materially improves the aerodynamic characteristics of the under portion of the plane in this region. In the form shown, it extends from a point near the airfoil formation 9, outwardly and rearwardly,—occupying three dimensions in space,—to the nearest aerodynamically satisfactory point of the entering edge 4 of the wing.

The article also includes an anti-buffetting fillet 22, formed on the opposite side of the article from the lift-section, and adapted to fit in with the streamline shape of the fuselage, in the manner shown in Fig. 5, to prevent the buffeting which otherwise exists in the region between the wing and the cowling.

The present invention further includes applying this sheet metal article, as a unit, around each exhaust stack (or around the single exhaust stack, in the case of a centrally located exhaust stack), and around the engine cowling and the entering edge of the wing, in such a manner that approximately 25%, or thereabouts, of the chord, or fore and aft length, of the airfoil formation, 11—12, is thereby positioned and located entirely ahead of the oblique center line of the exhaust stack 7. The airfoil 11—12, being especially designed, has such properties that the maximum ordinate thereof occurs at a point located about 30+ percent rearwardly of the entering edge, or wedge point, 11. Thus, the maximum velocity of airflow that this section will produce, and therefore the maximum downward force created thereby, will occur exactly on the center line of the exhaust stack. By these means, the airflow of the relative wind and of the propeller blast are positively and continuously deflected downwardly away from the exhaust stack orifice, commencing at a point considerably in front of the front edge of the exhaust stack, as shown best in Fig. 3.

One view of the phenomenon set up by this structure is that there is thereby produced an area of relative vacuum in the stack; that is to say, it is conceived that the first 25% of the airfoil, longitudinally, deflects the relative wind downwardly, at an angle somewhat less than its own angle, along a line $40^1$—$40^1$ shown in Fig. 3. The streamlines are "torn up" thereby, and turbulence occurs as and where shown. This leaves a vacuum chamber N, or creates a volume of thin air or relative rarification of air in this region which effect induces the exhaust gases to expand outwardly more rapidly in this region, which extends a considerable distance up into the stack 7. Another view of the phenomenon however, is that an unbalanced, downwardly-directed suction-force is set up on the exact center line of the exhaust stack and collectors, which suction extends a distance upwardly to the stack sufficient, at any speed of the engine sufficient to cause the propeller to produce a blast to positively educe whatever gases may be produced at the engine exhaust ports, and suck them downwardly from the exhaust stacks and positively accelerate their rearward flow. They are thus positively withdrawn out of the engine. From this point of view, one of the functions and results of the present structure is that the rearward velocity of the relative wind is so accelerated by the formation 11—12, that the exhaust gases at the center point of the stack are contacted and dragged-on by the relative wind and speeded up to such an extent that an ejector action is set up upon the exhaust gases, positively removing them from the collector.

In either event, the exhaust gases are positively removed from the engine, the collectors, and the exhaust stacks, as soon as they are formed. By virtue of this action and by eliminating air pockets from in front of the exhaust stacks and between the exhaust stacks and the entering edge and the engine cowling and the entering edge, the article of the present invention positively eliminates back-pressure from the exhaust stacks, as well as functioning to smooth the air-flow in the region of the exhaust stacks and in the region of the entering edge of the wing and around the engine cowling.

The deflector plate 19 precludes the necessity for extending the stack, or the rear edge thereof, out to the very edge of the airfoil section at 18 by, in effect, lengthening the rearward extension of the exhaust stack pipe and causing the path of the exhaust gases to flatten out and lie almost parallel to the relative wind the instant it emerges from the 4% boundary layer of air around the cowling, instead of, as is usual, letting it emerge substantially perpendicular to the relative wind, with obvious consequences. The angle the deflector plate makes with the relative wind in the present drawings is merely representational, this angle in practice being made such as to set up little or no head resistance due to vertical plate effect, when the craft is climbed steeply, thus turning it toward the vertical. In actual construction, a compromise is effectuated between the rather steep angle of the deflector plate shown in the present drawings, and that flat angle, or almost horizontal position, of the plate that aerodynamical perfection would require.

Due to the total elimination of back-pressure, there is a strong likelihood that the engine temperature will not rise as high as heretofore the case for similar engine speeds, etc.; consequently, the cowl flaps will not be required to be opened so widely as might be thought, and hence not even the outside air-stream will be deflected away from the entering edge point of portion 10. In most cases, the cowl-flap circular zone terminates, on both sides, above the present article. In any event, the air-stream emerging from the cowl-flaps and flowing alongside the nose, will, together with the propeller blast, be quite sufficient to cause the article of the present invention to be operative at any speed.

In order to allow for the twist or clockwise rotation of the primary cowling, due to the slight rotation made by the engine on starting and stopping, the article may have slotted bolt-holes 30 for receiving bolts-and-washers 40, the front portion of the article thus being secured to the primary cowling in such manner as to permit the primary cowling to carry the bolts in the slots from one end of the slots to the other, the article of this invention remaining stationary, locked in its proper fore-and-aft position. By these means, the side-wise movement of the primary cowling, amounting usually to about 1/8" in each direction, is satisfactorily allowed for and also the heat-caused expansion of the parts in the longitudinal direction is allowed for. The orifice 31 is, if desired, constructed with a 1/4" clearance from the stack, all around, and this takes up the heat-expansion caused by the exhaust gases and the hot engine-cowling.

By the use of this article as a cowling on the under side of the nose portion and around the adjacent entering edge of the wing, the under side of the nose portion of the craft is relieved of the commonly occurring "pockets" and other air "backing-up" formations, and the hitherto turbulent airflow in this region is positively straightened out and aligned fore-and-aft and smoothed out.

Due to its substantially unitary construction, etc., the article may be easily, yet securely, attached in place and as quickly removed from the craft.

In the modification shown in Fig. 6, the front portion of the article of this invention is not in any wise attached to the primary cowling, the rest of the article of Fig. 6, however, being constructed substantially as in Fig. 4, etc. In the form of Fig. 6, the free-end 41 of the article is pointed, and carries, on its under side, contacting the primary-cowling, a lining 42, preferably of micarta or the like. By this form, the necessity for slotted bolt-holes, split-sections, or the like, in order to accommodate the engine-torsion mentioned, is obviated.

Other ramifications and refinements of the structure shown are contemplated as being within the scope of the invention; for example, the article can, in one modification, be stamped at a single operation out of a single piece of sheet metal, and may be fastened by other means than the fasteners shown in the drawings.

It is to be understood that the disclosures made herein are by way of example, only, the invention being limited in its embodiments only by the scope of the sub-joined claim.

Having now described my invention in such full, clear and exact terms as to enable anyone skilled in the art to make and use same, what I claim as my property, and desire to secure by Letters Patent of the United States, is:

An airplane-engine exhaust-stack fairing for exhaust-stacks adapted to be located in that region of an airplane where exists a high positive aerodynamic pressure, said fairing being organized to not only fair and streamline the exhaust stack but to at the same time remove substantially all back-pressure in the engine-cylinders due to the exhausting and to said positive pressure, and comprising sheet-material having the major portion of its outer surface flat and co-planar, said surface having a distinct, positive ridge-formation extending fore-and-aft thereof, said ridge having an aperture for the reception of said exhaust-stack whereby to enclose said stack from the airstream, the outer surface of said ridge having, fore-and-aft, an aerodynamic configuration congruent with that portion of a Clark YH airfoil-section that lies between the mean chord and the upper, cambered surface of such airfoil, said portion being inverted, 25% of the chord of said airfoil lying ahead of the foremost edge of said exhaust stack, whereby to throw the greatest unbalanced aerodynamic force produced by movement of said formation thru the air substantially on the vertical centerline of said exhaust-stack at normal speeds and attitudes of the airplane.

ALEXANDER P. DE SEVERSKY.